US012566010B2

(12) United States Patent
Sun et al.

(10) Patent No.: US 12,566,010 B2
(45) Date of Patent: Mar. 3, 2026

(54) COMMUNICATION CONTROL METHOD AND APPARATUS FOR AIR CONDITIONER, AND COMMUNICATION SYSTEM AND READABLE STORAGE MEDIUM

(71) Applicants: GD MIDEA HEATING & VENTILATING EQUIPMENT CO., LTD., Foshan (CN); MIDEA GROUP CO., LTD., Foshan (CN)

(72) Inventors: Liangwei Sun, Foshan (CN); Lijun Mei, Foshan (CN); Tian Wu, Foshan (CN); Mengqiang Peng, Foshan (CN)

(73) Assignees: GD MIDEA HEATING & VENTILATING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 652 days.

(21) Appl. No.: 17/922,971

(22) PCT Filed: Sep. 10, 2021

(86) PCT No.: PCT/CN2021/117574
§ 371 (c)(1),
(2) Date: Nov. 3, 2022

(87) PCT Pub. No.: WO2022/121409
PCT Pub. Date: Jun. 16, 2022

(65) Prior Publication Data
US 2023/0160600 A1    May 25, 2023

(30) Foreign Application Priority Data
Dec. 9, 2020    (CN) .......................... 202011433039.4

(51) Int. Cl.
*F24F 11/88*    (2018.01)
*G06F 13/40*    (2006.01)

(52) U.S. Cl.
CPC .......... *F24F 11/88* (2018.01); *G06F 13/4068* (2013.01)

(58) Field of Classification Search
None
See application file for complete search history.

(56) References Cited

U.S. PATENT DOCUMENTS

| | | | | |
|---|---|---|---|---|
| 2005/0131666 A1* | 6/2005 | Tsai | ........................ | G06F 30/33 703/17 |
| 2019/0097738 A1* | 3/2019 | Tomita | .................. | H04L 7/0037 |
| 2019/0385057 A1 | 12/2019 | Litichever et al. | | |

FOREIGN PATENT DOCUMENTS

| | | |
|---|---|---|
| CN | 108063640 A | 5/2018 |
| CN | 109063652 A | 12/2018 |

(Continued)

OTHER PUBLICATIONS

EESR received in EP Application No. 21902117.7; mailed Nov. 9, 2023.

(Continued)

*Primary Examiner* — Paul B Yanchus, III
(74) *Attorney, Agent, or Firm* — K&L Gates LLP

(57) ABSTRACT

Provided are a communication control method and apparatus for an air conditioner, and a communication system and a readable storage medium. The communication control method for an air conditioner includes acquiring a voltage signal on a bus; determining a voltage slope-rising edge and a voltage slope-falling edge in the voltage signal based on that the voltage signal satisfies a comparison condition of a power supply voltage of a communication device and a reference voltage on the bus; performing time comparison on the voltage signal to obtain a processed voltage signal based on that the voltage slope-rising edge and the voltage slope-falling edge satisfy a slope comparison condition; determining, from a data model library, a target data model (Continued)

that is consistent with the processed voltage signal; and outputting data information corresponding to the target data model.

10 Claims, 7 Drawing Sheets

(56)                References Cited

FOREIGN PATENT DOCUMENTS

| CN | 109889419 | A | 6/2019 |
| CN | 111412580 | A | 7/2020 |
| CN | 112559417 | A | 3/2021 |
| EP | 2651023 | A1 | 10/2013 |
| EP | 3425585 | A1 | 1/2019 |
| WO | 2019002027 | A1 | 1/2019 |

OTHER PUBLICATIONS

ISR mailed Nov. 26, 2021 for PCT Application No. PCT/CN2021/117574.

* cited by examiner

Signal of the bus

Reading the signal

1

COMMUNICATION CONTROL METHOD AND APPARATUS FOR AIR CONDITIONER, AND COMMUNICATION SYSTEM AND READABLE STORAGE MEDIUM

CROSS-REFERENCES TO RELATED APPLICATIONS

The present disclosure is a national phase application of International Application No. PCT/CN2021/117574, filed on Sep. 10, 2021, which claims priority to Chinese Patent Application No. 202011433039.4 filed with China National Intellectual Property Administration on Dec. 9, 2020, the entireties of which are herein incorporated by reference.

FIELD

The present disclosure relates to the field of communication control, in particular, to a communication control method and a communication control apparatus for an air conditioner, and a communication system and a readable storage medium.

BACKGROUND

In related solutions, when the inductance, capacitance, resistance, signal reflection and the like in an air conditioner and other communication systems are disturbed, this will lead to the distortion of the signals obtained by means of detection.

Specifically, the sampling method of the MCU in the air conditioner and other communication systems is generally to multiply the frequency of a crystal oscillator. After a time of sampling, sampled data are read, for example, high and low levels of communication signals are identified, the MCU in the air conditioner and other communication systems will set a detection threshold, when the above distortion occurs, this will render that the data read by the MCU are wrong.

The 485 communication is taken as an example, and the detection threshold is −200 mV~200 mV; when the voltage value on a bus is greater than 200 mV, it is deemed that "1" is identified from the bus; when the voltage value on the bus is less than −200 mV, it is deemed that "0" is identified from the bus. When the above distortion occurs, as shown in FIG. 10, under normal circumstances, the voltage value of the differential signal of the bus is 0V, and the output signal of a communication interface chip is "1". When the signal of the bus is disturbed and fluctuates, the communication interface chip will output a wrong signal "0".

As shown in FIG. 11, in the case that a communication line is too long or the resistance and the capacitance are affected, when the communication rate is relatively fast, the signal transmission on the bus changes slowly; according to the detection threshold of the communication interface chip, for example, −200 mV~200 mV of the 485 communication, the time for the communication interface chip to output "1" will be shortened, and this will eventually lower communication quality.

SUMMARY

One embodiment of the present disclosure provides a communication control method for an air conditioner.

An embodiment of the present disclosure provides a communication control apparatus for an air conditioner.

An embodiment of the present disclosure provides a communication system.

An embodiment of the present disclosure provides a readable storage medium.

In view of this, according to the embodiments of the present disclosure, the present disclosure provides a communication control method for an air conditioner, and the air conditioner is connected with a bus, and the communication control method for an air conditioner includes acquiring a voltage signal on the bus; determining a voltage slope-rising edge and a voltage slope-falling edge in the voltage signal based on that the voltage signal satisfies a comparison condition of a power supply voltage of the air conditioner and a reference voltage on the bus; performing time comparison on the voltage signal to obtain a processed voltage signal based on that the voltage slope-rising edge and the voltage slope-falling edge satisfy a slope comparison condition; determining, from a data model library, a target data model that is consistent with the processed voltage signal; and outputting data information corresponding to the target data model.

In the embodiments according to the embodiments of the present disclosure, a communication control apparatus for an air conditioner is provided, and the air conditioner is connected with a bus, and the communication control apparatus for the air conditioner includes an acquiring device, configured to acquire the voltage signal on the bus; a determining device, configured to: determine a voltage slope-rising edge and a voltage slope-falling edge in the voltage signal based on that the voltage signal satisfies a comparison condition of a power supply voltage of the air conditioner and a reference voltage on the bus, perform time comparison on the voltage signal to obtain a processed voltage signal based on that the voltage slope-rising edge and the voltage slope-falling edge satisfy a slope comparison condition, and determine, from a data model library, a target data model that is consistent with the processed voltage signal; and an output device, configured to output data information corresponding to the target data model.

The embodiment of the present disclosure provides a communication system, and the communication system includes a memory and a processor, and the processor executes the program or the instruction stored in the memory to achieve the steps of any communication control method for an air conditioner according to the embodiments, and thus, the communication system has all the beneficial effects of any one of the above-mentioned communication control method for an air conditioner.

The embodiment of the present disclosure provides a readable storage medium, and when the program or the instruction stored in the readable storage medium is executed, the steps of any communication control method for an air conditioner according to the embodiments are achieved, and thus, the readable storage medium has all the beneficial effects of any communication control method for an air conditioner described above.

BRIEF DESCRIPTION OF THE DRAWINGS

The above and/or additional embodiments of the present disclosure will be understood from the following description of the embodiments in combination with the accompanying drawings.

DETAILED DESCRIPTION OF THE DISCLOSURE

The present disclosure will be further described in detail with reference to the accompanying drawings and specific implementation modes. It should be noted that the embodiments and features of the embodiments of the present disclosure can be combined with each other without conflict.

In the following description, numerous specific details are set forth in order to provide a thorough understanding of the present disclosure. However, the present disclosure may be implemented otherwise than as described herein. Accordingly, the scope of the present disclosure is not limited by the specific embodiments disclosed below.

Figure 1:
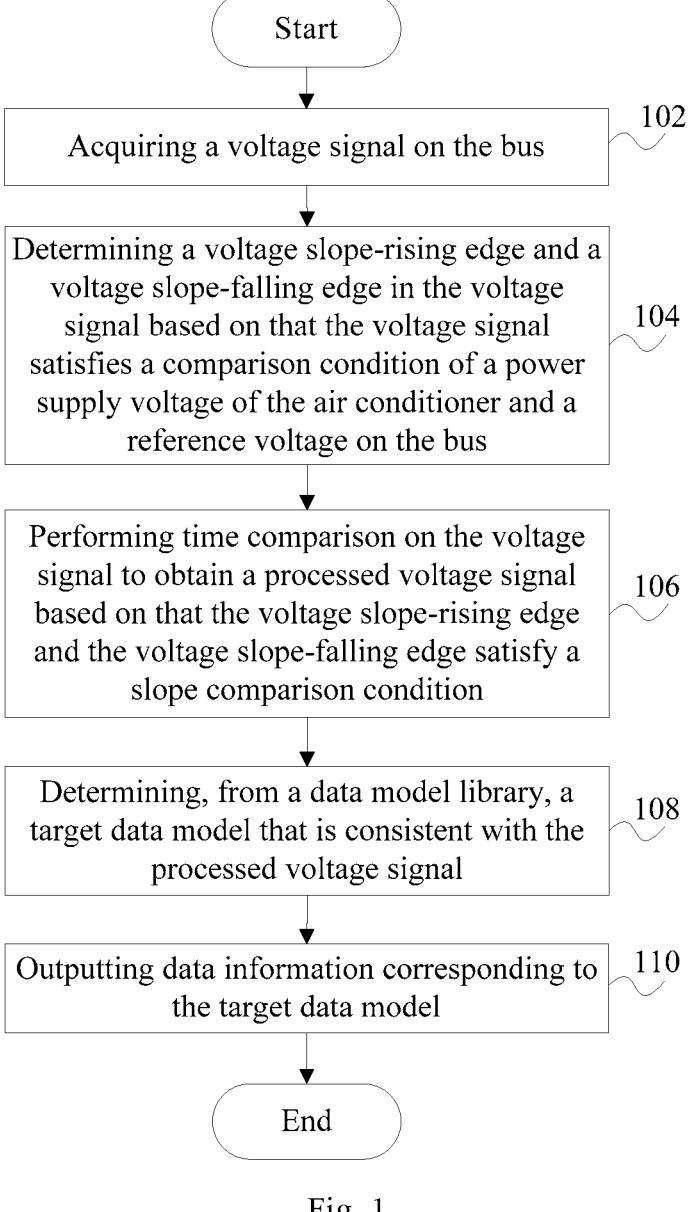
FIG. 1 is a schematic view of the flow of a communication control method for an air conditioner in an embodiment of the present disclosure.

As shown in FIG. 1, according to embodiments of the present disclosure, a communication control method for an air conditioner is provided, and the air conditioner is connected with a bus, and the communication control method for an air conditioner includes Step 102, acquiring a voltage signal on the bus;

Step 104, determining a voltage slope-rising edge and a voltage slope-falling edge in the voltage signal based on that the voltage signal satisfies a comparison condition of a power supply voltage of the air conditioner and a reference voltage on the bus;

Step 106, performing time comparison on the voltage signal to obtain a processed voltage signal based on that the voltage slope-rising edge and the voltage slope-falling edge satisfy a slope comparison condition;

Step 108, determining, from a data model library, a target data model that is consistent with the processed voltage signal; and Step 110, outputting data information corresponding to the target data model.

In the embodiment, the voltage signal on the bus can be a number of discrete sampling values that are consecutive in time.

In an embodiment of the present disclosure, through detecting the voltage signal on the bus, a data model corresponding to the voltage signal on the bus is obtained, and the data model is compared with the models stored in the data model library, and in the case of consistency in comparison, the data information in the data model which is consistent in comparison is outputted (that is, the data information in the target data model in this application).

For example, through performing voltage comparison on acquired voltage information collected on the bus, the slope comparison on the voltage slope-rising edge and the voltage slope-falling edge achieves screening voltage data, and the signal of the data obtained by collection is restored in a way of time comparison; in this process, the voltage signal on the bus is identified by means of model comparison, and the occurrence of the phenomenon is reduced where signal data obtained by means of detection is abnormal when the inductance, capacitance, resistance and signal reflection and etc. in an air conditioner and other communication systems are disturbed.

In one of the embodiments, data models are stored in the data model library.

Generally, one frame of data in a communication protocol includes a dozen bytes to dozens of bytes, and each byte has 10 bits of data. Generally, one byte includes a start bit "0" and a stop bit "1" and eight bits of data between the start bit "0" and the stop bit "1", and these eight bits of data are used for data transmission. Based on this, the data models in the data model library are data models established based on ten bits of data. In the case that each bit of data can be "1" or "0", $2^8=256$ data models need to be established and stored, for example, "1111111100" is a communication data model, and it is represented with hexadecimal as a byte "FE", and the first "0" is the start bit and the last "1" is the stop bit. For another example, "1101010100" is represented with hexadecimal as a byte "aa". Through establishing the above data models, when the processed voltage signal is obtained, it can be compared with the data models in the data model library, to obtain data information such as "FE" or "aa".

Considering that the data models need to occupy a relatively large storage space, and the model comparison also requires a large amount of data processing, the eight bits of data can be divided into two parts of 4+4, that is, the first four bits of data are saved as a model and the last four bits of data are saved as one datum, and then, the first four bits of data can be completely represented only by means of $2^4=16$ models; based on the same reasons, 16 models are also needed to represent the last four bits of datum; and in this circumstance, the data model library only need 32 models. In this solution, the storage space of the models and the amount of data required for model comparison are effectively reduced.

In the embodiment, the contents of determining whether the voltage signal satisfies a comparison condition of a power supply voltage of an air conditioner and a reference voltage on the bus are defined.

Generally, an air conditioner is connected with a bus via a communication chip to acquire signals on the bus; when the chip is used, a sampling voltage value collected by the chip will be lower than the power supply voltage, in order to reduce the occurrence of a situation that the air conditioner cannot collect or restore the voltage signal as the voltage value corresponding to the voltage signal on the bus is too high, for example, it is higher than the power supply voltage, in the embodiment of the present disclosure, when the voltage comparison is performed, it is defined that any sampling voltage value is not higher than the power supply voltage and to accurately correct the voltage signal on the bus and reduce the probability of outputting wrong signals.

In addition, since the embodiment of the present disclosure needs to further determine whether a voltage slope-rising edge and a voltage slope-falling edge satisfy a slope comparison condition, if the voltage value corresponding to the voltage signal obtained by collection is too low, the accuracy of restoration will be affected, or even more, the signal cannot be corrected.

In order to solve the above problems, the embodiment of the present disclosure defines that the difference between any sampling voltage value and the reference voltage should be large enough, for example, greater than a preset threshold, and to ensure that the sampling voltage value is large enough, to ensure the accuracy of restoration.

Figure 7:
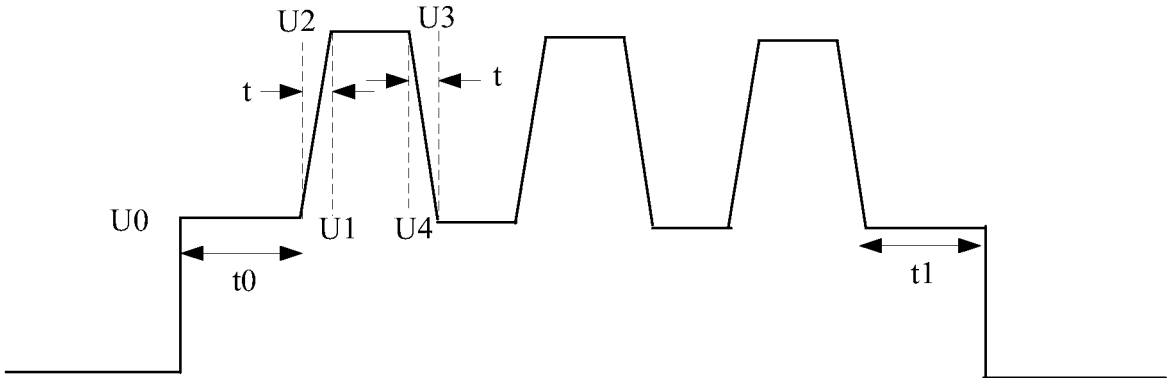
FIG. 7 is a schematic view of a voltage signal in an embodiment of the present disclosure.

In any one of the above embodiments, the preset threshold can be set according to actual needs, for example, as shown in FIG. 7, when the power supply voltage of the communication chip is 3.3V, a sampling voltage value U2 and a sampling voltage value U3 cannot be higher than 3.3V, the value of the preset threshold can be 0.5V, and then a reference voltage U0 cannot be higher than 2.5V.

In any one of the above embodiments, if the voltage signal does not satisfy the comparison condition of the power supply voltage of the air conditioner and the reference voltage on the bus, a wrong data model is outputted to remind users to treat.

In an embodiment of the present disclosure, the contents of determining whether a voltage slope-rising edge and a voltage slope-falling edge satisfy a slope comparison condition are defined.

Figure 2:
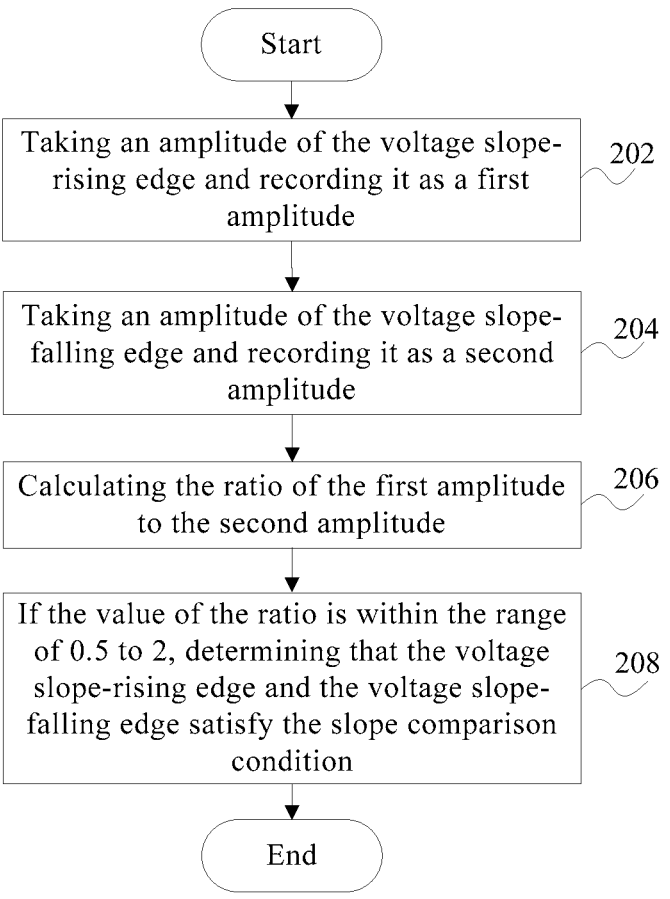
FIG. 2 is a schematic view of the flow of determining whether a voltage slope-rising edge and a voltage slope-falling edge satisfy a slope comparison condition in an embodiment of the present disclosure.

For example, as shown in FIG. 2, the contents of determining whether the voltage slope-rising edge and the voltage slope-falling edge satisfy a slope comparison condition comprise:

Step 202, taking an amplitude of the voltage slope-rising edge and recording it as a first amplitude;

Step 204, taking an amplitude of the voltage slope-falling edge and recording it as a second amplitude;

Step 206, calculating the ratio of the first amplitude to the second amplitude; and Step 208, if the value of the ratio is within the range of 0.5 to 2, determining that the voltage slope-rising edge and the voltage slope-falling edge satisfy the slope comparison condition.

By comparing the first amplitude and the second amplitude determined above, whether there is a relatively large difference between the waveform of a voltage rising edge and the waveform of a voltage falling edge is determined; in the case that there is a relatively large difference, it is determined that the voltage signal does not satisfy the slope comparison condition, and then, a wrong data model is outputted to remind users to treat.

For example, in order to facilitate quantitative treatment on whether the voltage signal satisfies the slope comparison condition, the embodiment of the present disclosure determines whether there is a relatively large difference between the waveform of the voltage rising edge and the waveform of the voltage falling edge by comparing the size of the amplitudes of slopes. For example, when the difference between the first amplitude and the second amplitude does not exceed a half, it is determined that the difference between the waveform of the voltage rising edge and the waveform of the voltage falling edge is relatively small, that is, the slope comparison condition is satisfied; considering that the first amplitude can be greater or smaller than the second amplitude, if comparison cases are divided separately, there will be much data that need to be processed.

In order to reduce the amount of data processing, the embodiment of the present disclosure quantizes the conditions for determining whether the difference between the first amplitude and the second amplitude does not exceed a half by means of determining the fluctuation range of the ratio of the first amplitude to the second amplitude, and the ratio should be greater than 0.5 and less than 2, in the process of determining the difference between the waveform of the voltage rising edge and the waveform of the voltage falling edge, the difference can be determined only by determining whether the ratio is greater than 0.5 and less than 2, to reduce comparison difficulty.

Figure 3:
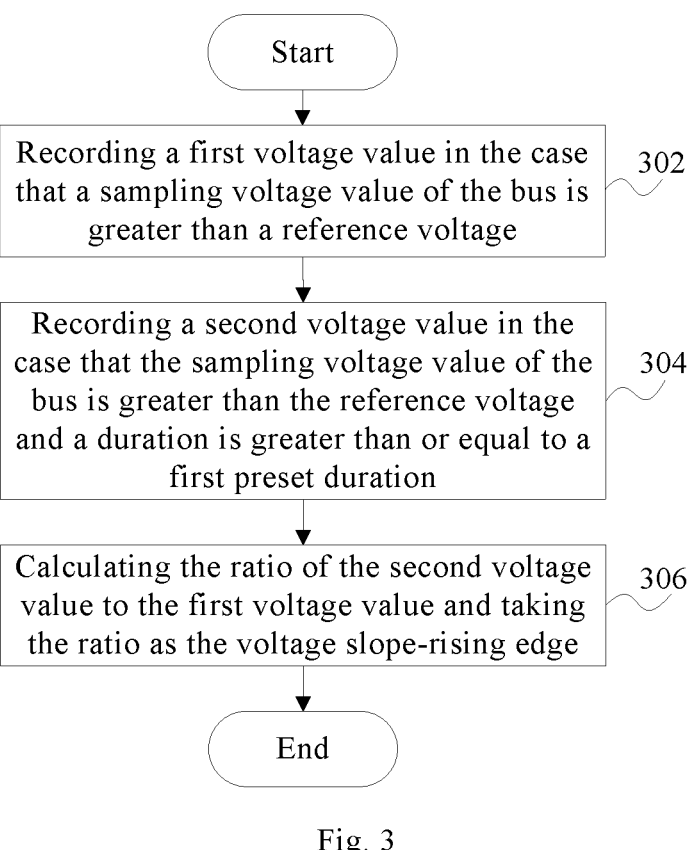
FIG. 3 is a schematic view of the flow of determining a voltage slope-rising edge and a voltage slope-falling edge in an embodiment of the present disclosure.

In an embodiment of the present disclosure, a process of determining a voltage slope-rising edge and a voltage slope-falling edge is provided, and as shown in FIG. 3, it includes Step 302, recording a first voltage value in the case that a sampling voltage value of the bus is greater than a reference voltage;

Step 304, recording a second voltage value in the case that the sampling voltage value of the bus is greater than the reference voltage and a duration is greater than or equal to a first preset duration; and Step 306, calculating the ratio of the second voltage value to the first voltage value and taking the ratio as the voltage slope-rising edge.

As for the voltage slope-falling edge, the moment when the sampling voltage value of the bus is the maximum voltage value is searched and taken as a start moment, and the sampling voltage value recorded after the first preset duration is a third voltage value; and ratio of the maximum voltage value to the third voltage value is calculated and taken as the voltage slope-falling edge.

In the embodiment, generally, the air conditioner collects data on the bus periodically. If the voltage value is obtained by collection, after the voltage difference is determined, the ratio of the voltage difference to the time corresponding to the voltage difference is calculated to obtain a corresponding slope. Considering that the embodiment of the present disclosure determines whether the slope comparison condition is satisfied by comparing the size of the ratio of the first amplitude to the second amplitude, when the time corresponding to the voltage difference is the same, the ratio of the second voltage value to the first voltage value can be regarded as the voltage slope-rising edge. Based on the same reasons, the ratio of the maximum voltage value to the third voltage value is regarded as the voltage slope-falling edge, to reduce the amount of data that needs to be processed by the air conditioner.

For example, as shown in FIG. 7, the reference voltage is U0; when the sampling voltage value is greater than the reference voltage U0, a first voltage value U1 is recorded, and after the first preset duration t, a second voltage value U2 is recorded; the sampling voltage value is a maximum voltage value U3, and after the first preset duration t of the maximum voltage value U3, a third voltage value U4 is recorded; the ratio of U2 to U1 is calculated and recorded as λ1, the ratio of U3 to U4 is calculated and recorded as λ2, and since the difference between λ1 and λ2 does not exceed a half, it is determined that the slope comparison condition is satisfied.

Figure 8:
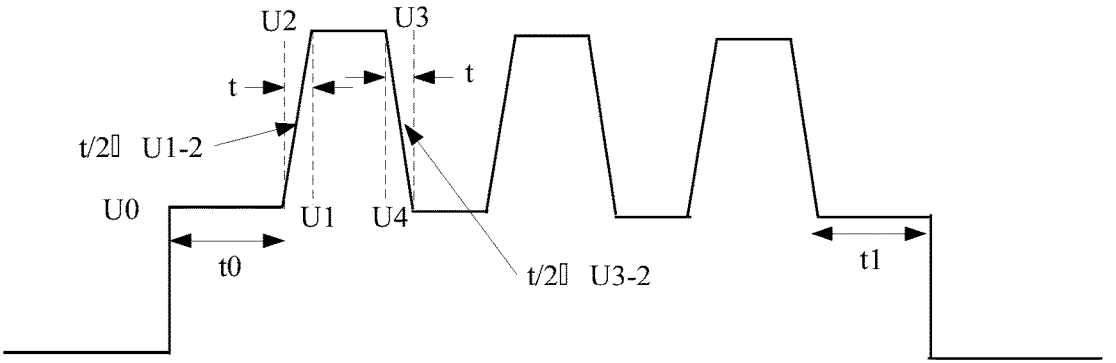
FIG. 8 is a schematic view of a voltage signal in an embodiment of the present disclosure.

In one of the embodiments, as shown in FIG. 8, the reference voltage is U0; when the sampling voltage value is greater than the reference voltage U0, the first voltage value U1 is recorded, and after a duration of t/2, i.e., half of the first preset duration t, a fourth voltage value U1-2 is recorded; then after another duration of t/2, i.e., half of the first preset duration t, the second voltage value U2 is recorded, and the sampling voltage value is a maximum voltage value U3; after a duration of t/2 following the maximum voltage value U3, i.e., half of the first preset duration t, a fifth voltage value U3-2 is recorded; then after another duration of t/2, i.e., half of the first preset duration t, the third voltage value U3 is recorded; the ratio of U1-2 to U1 is calculated and recorded as μ1, the ratio of U2 to U1-2 is calculated and recorded as μ3, the ratio of U3 to U3-2 is calculated and recorded as μ3, the ratio of U3-2 to U4 is calculated and recorded as μ4, if the difference between μ1 and μ4 does not exceed a half and the difference between μ2 and μ3 does not exceed a half, it is determined that the slope comparison condition is satisfied.

In the embodiment, contents on how to perform time comparison on a voltage signal to obtain a processed voltage signal are defined.

Binary data is a machine language that a machine can identify, that is, datum "1" and datum "0". In the embodiment of the present disclosure, the first numerical code in the binary data can be either of the datum "1" and the datum "0", and the second numerical code in the corresponding binary data is the other numerical code except the first numerical code, for example, in one situation, when the first numerical code is the datum "1", the second numerical code is the datum "0"; in the other situation, when the first numerical code is the datum "0", the second numerical code is the datum "1"; in the embodiment of the present disclosure, it is selected that the first numerical code is the datum "0" and the second numerical code is the datum "1".

The air conditioner is connected with the bus, and data transmission is carried out by means of current transmission, for example, if other communication devices on the bus want to send datum 0, they will source a constant current M from the bus, and they will source a constant current N to the bus when sending datum 1, and N can be 0, and it is only necessary to connect a sampling resistor in series with a power supply, the current sourced by other communication devices on the bus will pass this sampling resistor, and a voltage will be formed on the sampling resistor, and the data transmitted by other communication devices will be obtained by collecting the signal of the voltage on this resistor.

In the embodiment, through the time comparison on the voltage signal, the number of "1" or "0" contained in the voltage signal is determined, for example, a single "1", or two "1".

Figure 4:
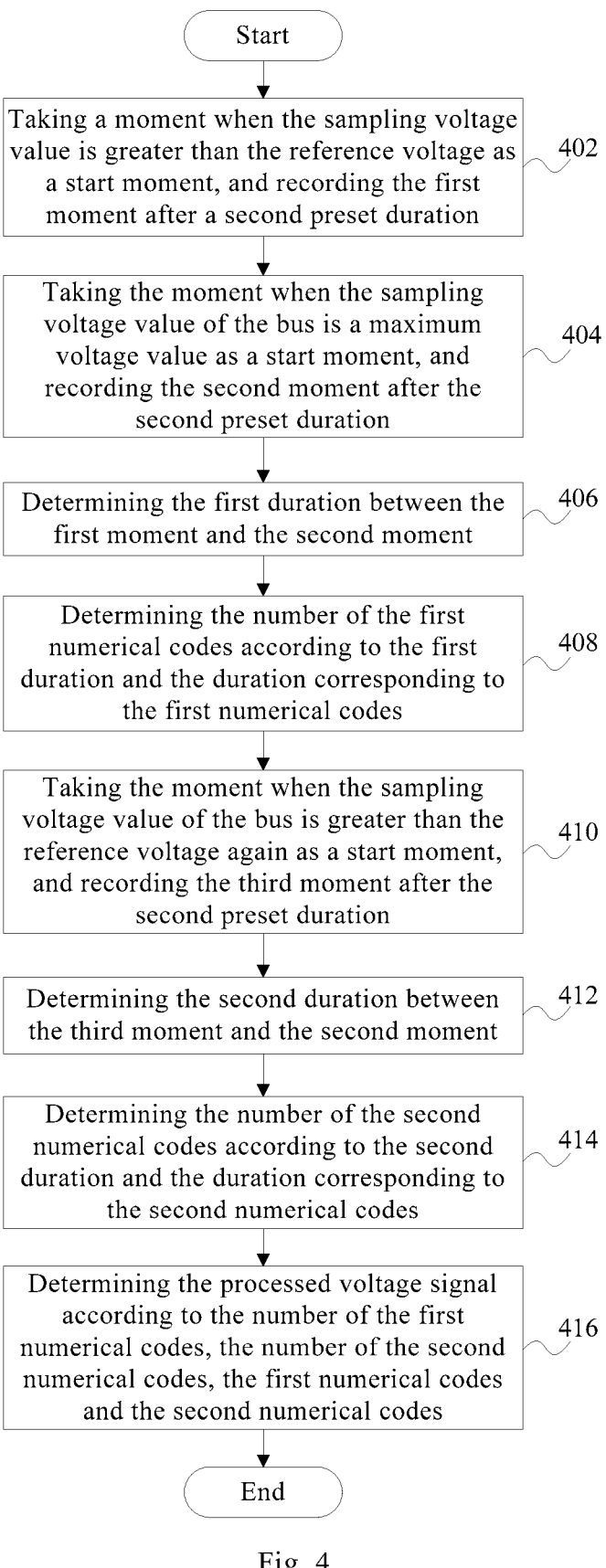
FIG. 4 is a schematic view of the flow of performing time comparison on a voltage signal to obtain a processed voltage signal in an embodiment of the present disclosure.

FIG. 4 shows the contents of defining how to perform time comparison on the voltage signal to obtain a processed voltage signal. As shown in FIG. 4, Step 402, taking a moment when the sampling voltage value is greater than the reference voltage as a start moment, and recording the first moment after a second preset duration;

Step 404, taking the moment when the sampling voltage value of the bus is the maximum voltage value as a start moment, and recording the second moment after the second preset duration;

Step 406, determining the first duration between the first moment and the second moment;

Step 408, determining the number of the first numerical codes according to the first duration and the duration corresponding to the first numerical codes;

Step 410, taking the moment when the sampling voltage value of the bus is greater than the reference voltage again as a start moment, and recording the third moment after the second preset duration;

Step 412, determining the second duration between the third moment and the second moment;

Step 414, determining the number of the second numerical codes according to the second duration and the duration corresponding to the second numerical codes; and Step 416, determining the processed voltage signal according to the number of the first numerical codes, the number of the second numerical codes, the first numerical codes and the second numerical codes.

Generally, the method for determining the voltage signal on the bus is to determine the number of the first numerical codes and the number of the second numerical codes in the binary data according to the duration of the high level or the duration of the low level on the bus; due to the signal interference on the bus, the voltage collected by the air conditioner fluctuates greatly and the accuracy is low.

In order to solve the above problem, the embodiment of the present disclosure adopts the method of time comparison to determine the number of the first numerical codes and the number of the second numerical codes in the binary data and restore the data of the voltage signal according to the number of the first numerical codes and the number of the second numerical codes, and in this process, the influence of the above case on reading the signal is reduced and the reliability of the signal is ensured.

In any one of the above embodiments, when the difference between the first duration and the duration corresponding to M first numerical codes is less than or equal to a set value, it is determined that the first duration corresponds to M consecutive first numerical codes; when the difference between the second duration and the duration corresponding to N second numerical codes is less than or equal to the set value, it is determined that the second duration corresponds to N consecutive second numerical codes, and M and N are natural numbers.

In the embodiment, considering the influence of the bus which is too long, or the capacitance connected to the bus or the sampling resistor connected to the bus, the length of the voltage signal on the bus will change; in order to eliminate this influence, the fluctuation range between the first duration and the duration corresponding to the M first numerical codes is given, by calculating the difference between the first duration and the duration corresponding to the M first numerical codes and comparing the difference with a set value, whether the fluctuation range exceeds the set value is determined. If it does not exceed the set value, it is determined that the first duration corresponds to M consecutive first numerical codes, and it can be understood that the voltage signals between the first moment and the second moment correspond to M consecutive first numerical codes; based on the same reasons, the voltage signals between the second moment and third moment correspond to N consecutive second numerical codes; and in the above process, the voltage signal obtained by collection is restored and to obtain the processed voltage signal.

In any one of the above embodiments, the communication control method for an air conditioner further includes obtaining the baud rate of the air conditioner and the actual communication time on the bus; and determining the duration corresponding to the first numerical code and the duration corresponding to the second numerical code according to the baud rate and the actual communication time.

In the embodiment, considering that the baud rates for the air conditioner to communicate are different, the duration corresponding to the first numerical code will also be different from the duration corresponding to the second numerical code, and in order to ensure the accuracy of the target data model, it is necessary to calibrate the duration corresponding to the first numerical code and the duration corresponding to the second numerical code; and the duration corresponding to the first numerical code and the duration corresponding to the second numerical code are determined according to the baud rate of the air conditioner and the actual communication time on the bus.

In any one of the above embodiments, the actual communication time is the difference between the theoretical communication time on the bus and a first waiting time and a second waiting time, and the theoretical communication time can be understood as a duration when the voltage value on the bus is greater than or equal to the reference voltage, and after the first waiting duration is that the duration when the voltage value on the bus is greater than the reference voltage is the first waiting time, the obtaining of the sampling voltage value on the bus is started; based on the same reasons, the second waiting time is the time when sampling is not performed, which corresponds to the tail of the theoretical communication time.

In one of the embodiments, the first waiting time and the second waiting time belong to time when the voltage signal on the bus is not sampled, and their specific values can be preset.

Figure 9:
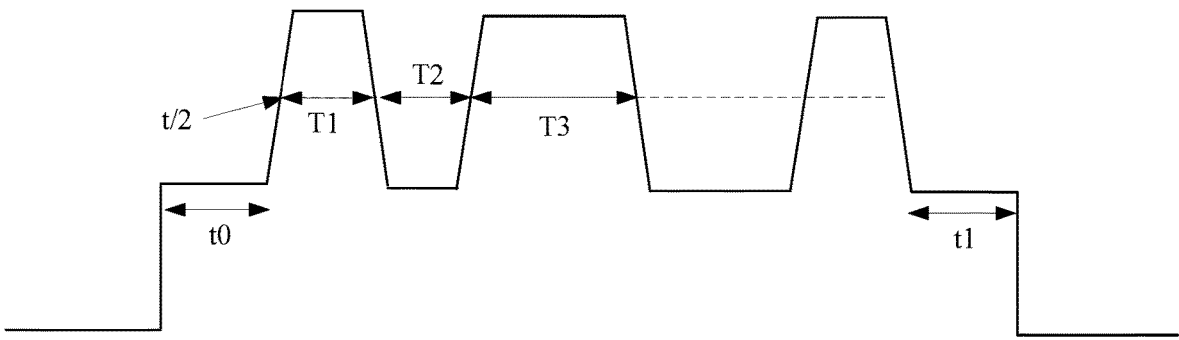
FIG. 9 is a schematic view of a voltage signal in an embodiment of the present disclosure.
Figure 10:
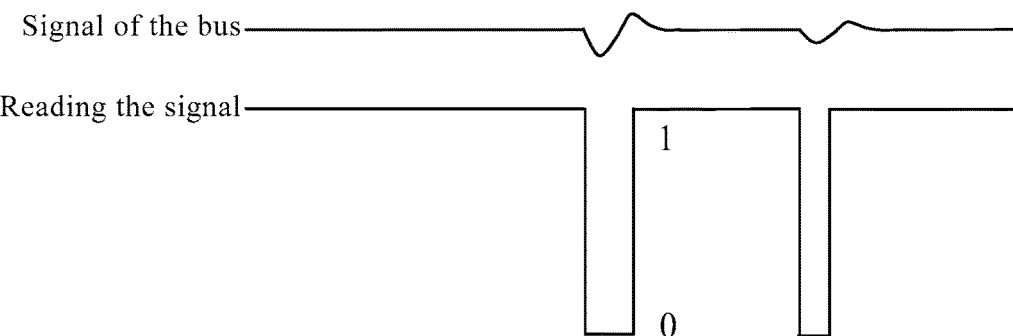
FIG. 10 is an oscillogram of the distortion of a signal collected by an air conditioner in a related embodiments.
Figure 11:
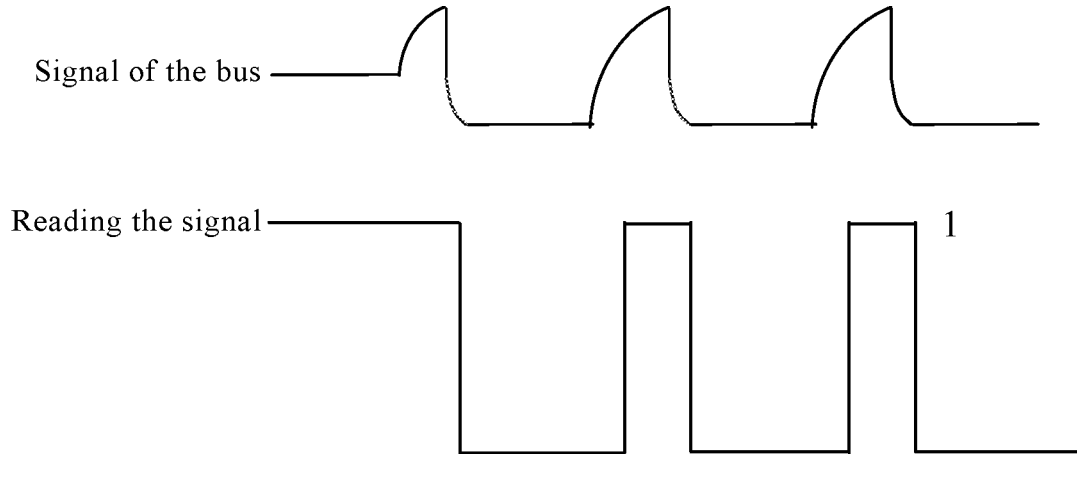
FIG. 11 is an oscillogram of the distortion of a signal collected by an air conditioner in the related embodiments.

For example, as shown in FIG. 9, in the case that the baud rate and the actual communication time are determined, the duration of the first numerical code and the duration of the second numerical code are determined, that is, the time of a single bit is also fixed.

After the first duration T1 is determined, the difference between the first duration T1 and a fixed time T is calculated, and the difference is compared with the set value, and the set value can be 0.5, if the difference between the first duration T1 and the fixed time T is less than 0.5, it is determined that the fixed time T is equal to the first duration T1 and it is determined that the air conditioner receives one "0"; based on the same reasons, if the difference between the second duration T2 and the fixed time T is less than 0.5, it is determined that the fixed time T is equal to the second duration T2 and it is determined that the air conditioner receives one "1".

In the same manner, the third duration T3 is determined, and if the difference between the third duration T3 and two fixed time T is less than 0.5, it is determined that the air conditioner receives two "0", and so on, if the difference between the $N^{th}$ duration Tn and n fixed time T is less than 0.5, it is determined that the air conditioner receives one "0".

Figure 5:
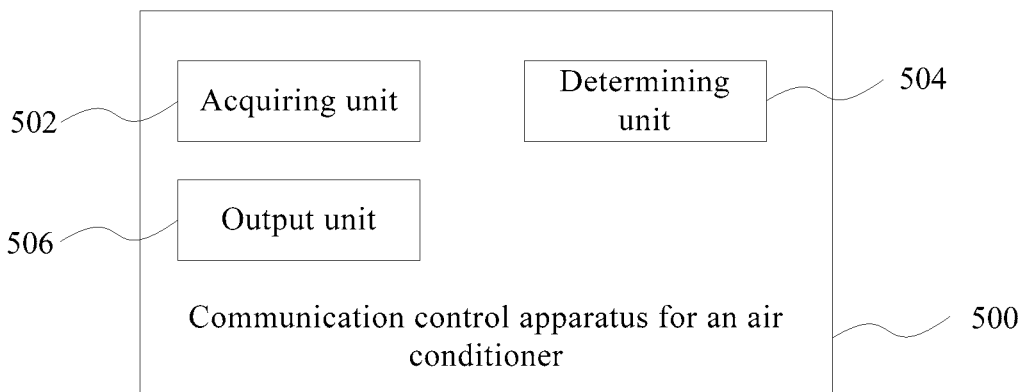
FIG. 5 is a schematic block diagram of a communication control apparatus for an air conditioner in an embodiment of the present disclosure.

In one embodiment of the present disclosure, as shown in FIG. 5, a communication control apparatus 500 for an air conditioner is provided, and the communication control apparatus 500 for an air conditioner includes an acquiring device 502, a determining device 504 and an output device 506, and the air conditioner is connected with a bus and performs data communication through the bus. Wherein, the acquiring device 502 is configured to acquire the voltage signal on the bus; the determining device 504 is configured to: determine a voltage slope-rising edge and a voltage slope-falling edge in the voltage signal based on that the voltage signal satisfies a comparison condition of a power supply voltage of the air conditioner and a reference voltage on the bus, perform time comparison on the voltage signal to obtain a processed voltage signal based on that the voltage slope-rising edge and the voltage slope-falling edge satisfy a slope comparison condition, and determine, from a data model library, a target data model that is consistent with the processed voltage signal; and the output device 506 is configured to output data information corresponding to the target data model.

The embodiment of the present disclosure provides a communication control apparatus 500 for an air conditioner, which includes the acquiring device 502, the determining device 504 and the output device 506. Wherein, through detecting the voltage signal on the bus, the data model corresponding to the voltage signal on the bus is obtained, and the data model is compared with the models stored in the data model library, and in the case of consistency in comparison, the data information in the data model which is consistent in comparison is outputted (that is, the data information in the target data model in this application).

For example, through performing voltage comparison on acquired voltage information collected on the bus and the slope comparison on the voltage slope-rising edge and the voltage slope-falling edge, the screening of voltage data is achieved, and the signal of data obtained by collection is restored by time comparison; in this process, the voltage signal on the bus is identified by means of model comparison, and the occurrence of the phenomenon is reduced where signal data obtained by means of detection is abnormal when the inductance, capacitance, resistance, signal reflection and etc. in an air conditioner and other communication systems are disturbed.

In one of the embodiments, data models are stored in the data model library.

Generally, one frame of data in a communication protocol includes a dozen bytes to dozens of bytes, and each byte has 10 bits of data. Generally, one byte includes a start bit "0" and a stop bit "1" and eight bits of data between the start bit "0" and the stop bit "1", and these eight bits of data are used for data transmission. Based on this, the data models in the data model library are data models established based on ten bits of data. In the case that each bit of data can be "1" or "0", $2^8=256$ data models need to be established and stored, for example, "1111111100" is a communication data model, and it is represented with hexadecimal as a byte "FE", and the first "0" is the start bit and the last "1" is the stop bit. For another example, "1101010100" is represented with hexadecimal as a byte "aa". Through establishing the above data models, when the processed voltage signal is obtained, it can be compared with the data models in the data model library, to obtain data information such as "FE" or "aa".

Considering that the data models need to occupy a relatively large storage space, and the model comparison also requires a large amount of data processing, the eight bits of data can be divided into two parts of 4+4, that is, the first four bits of data are saved as a model and the last four bits of data are saved as one datum, and then, the first four bits of data can be completely represented only by means of $2^4=16$ models; based on the same reasons, 16 models are also needed to represent the last four bits of datum; and in this circumstance, the data model library only need 32 models. In this solution, the storage space of the models and the amount of data required for model comparison are effectively reduced.

In the embodiment, the contents of determining whether the voltage signal satisfies a comparison condition of a power supply voltage of an air conditioner and a reference voltage on the bus are defined.

Generally, an air conditioner is connected with a bus via a communication chip to acquire signals on the bus; when the chip is used, a sampling voltage value collected by the chip will be lower than the power supply voltage, in order to reduce the occurrence of a situation that the air conditioner cannot collect or restore the voltage signal as the voltage value corresponding to the voltage signal on the bus is too high, for example, it is higher than the power supply voltage, in the embodiment of the present disclosure, when the voltage comparison is performed, the determining device 504 is configured to define that any sampling voltage value is not higher than the power supply voltage and to accurately correct the voltage signal on the bus and reduce the probability of outputting wrong signals.

In addition, since the embodiment of the present disclosure needs to further determine whether the voltage slope-rising edge and the voltage slope-falling edge satisfy the slope comparison condition, if the voltage value corresponding to the voltage signal obtained by collection is too low, the accuracy of restoration will be affected, or even more, the signal cannot be corrected.

In order to solve the above problems, the determining device 504 defines that the difference between any sampling voltage value and the reference voltage should be large enough, for example, greater than a preset threshold, and to ensure that the sampling voltage value is large enough, to ensure the accuracy of restoration.

In any one of the above embodiments, the preset threshold can be set according to actual needs, for example, when the power supply voltage of the communication chip is 3.3V, the value of the preset threshold can be 0.5V, and then the reference voltage cannot be higher than 2.5V.

In any one of the above embodiments, if the voltage signal does not satisfy the comparison condition of the power supply voltage of the air conditioner and the reference voltage on the bus, a wrong data model is outputted to remind users to treat.

In the embodiment, the contents of determining whether a voltage slope-rising edge and a voltage slope-falling edge satisfy a slope comparison condition are defined.

For example, the determining device 504 is configured to take an amplitude of the voltage slope-rising edge and record it as a first amplitude, take an amplitude of the voltage slope-falling edge and record it as a second amplitude, calculate the ratio of the first amplitude to the second amplitude, and, if the value of the ratio is within the range of 0.5 to 2, determine that the voltage slope-rising edge and the voltage slope-falling edge satisfy the slope comparison condition.

By comparing the first amplitude and the second amplitude determined above, whether there is a relatively large difference between the waveform of a voltage rising edge and the waveform of a voltage falling edge is determined; in the case that there is a relatively large difference, it is determined that the voltage signal does not satisfy the slope comparison condition, and then, a wrong data model is outputted to remind users to treat.

For example, in order to facilitate quantitative treatment on whether the voltage signal satisfies the slope comparison condition, the embodiment of the present disclosure determines whether there is a relatively large difference between the waveform of the voltage rising edge and the waveform of the voltage falling edge by comparing the size of the amplitudes of slopes. For example, when the difference between the first amplitude and the second amplitude does not exceed a half, it is determined that the difference between the waveform of the voltage rising edge and the waveform of the voltage falling edge is relatively small, that is, the slope comparison condition is satisfied; considering that the first amplitude may be greater or smaller than the second amplitude, if comparison cases are divided separately, there will be much data that need to be processed.

In order to reduce the amount of data processing, the embodiment of the present disclosure quantizes the conditions for determining whether the difference between the first amplitude and the second amplitude does not exceed a half by means of determining the fluctuation range of the ratio of the first amplitude to the second amplitude, and the ratio should be greater than 0.5 and less than 2, in the process of determining the difference between the waveform of the voltage rising edge and the waveform of the voltage falling edge, the difference can be determined only by determining whether the ratio is greater than 0.5 and less than 2, to reduce comparison difficulty.

In the embodiment, the determining device 504 is configured to determine a voltage slope-rising edge and a voltage slope-falling edge, and a first voltage value is recorded in the case that the sampling voltage value of the bus is greater than the reference voltage; a second voltage value is recorded in the case that the sampling voltage value of the bus is greater than the reference voltage and the duration is greater than or equal to a first preset duration; and the ratio of the second voltage value to the first voltage value is calculated and the ratio is used as the voltage slope-rising edge.

As for the voltage slope-falling edge, the moment when the sampling voltage value of the bus is the maximum voltage value is searched and taken as a start moment, and the sampling voltage value recorded after the first preset duration is a third voltage value; and ratio of the maximum voltage value to the third voltage value is calculated and is taken as the voltage slope-falling edge.

In the embodiment, generally, the air conditioner collects data on the bus periodically. If the voltage value is obtained by collection, after the voltage difference is determined, the ratio of the voltage difference to the time corresponding to the voltage difference is calculated to obtain a corresponding slope. Considering that the embodiment of the present disclosure determines whether the slope comparison condition is satisfied by comparing the size of the ratio of the first amplitude to the second amplitude, when the time corresponding to the voltage difference is the same, the ratio of the second voltage value to the first voltage value can be regarded as the voltage slope-rising edge. Based on the same reasons, the ratio of the maximum voltage value to the third voltage value is regarded as the voltage slope-falling edge, to reduce the amount of data that needs to be processed by the air conditioner.

For example, as shown in FIG. 7, the reference voltage is U0; when the sampling voltage value is greater than the reference voltage U0, a first voltage value U1 is recorded, and after the first preset duration t, a second voltage value U2 is recorded; the sampling voltage value is a maximum voltage value U3, and after the first preset duration t of the maximum voltage value U3, a third voltage value U4 is recorded; the ratio of U2 to U1 is calculated and recorded as λ1, the ratio of U3 to U4 is calculated and recorded as λ2, and since the difference between λ1 and λ2 does not exceed a half, it is determined that the slope comparison condition is satisfied.

In one of the embodiments, as shown in FIG. 8, the reference voltage is U0; when the sampling voltage value is greater than the reference voltage U0, the first voltage value U1 is recorded, and after a duration of t/2, i.e., half of the first preset duration t, a fourth voltage value U1-2 is recorded; then after another duration of t/2, i.e., half of the first preset duration t, the second voltage value U2 is recorded, and the sampling voltage value is a maximum voltage value U3; after a duration of t/2 following the maximum voltage value U3, i.e., half of the first preset duration t, a fifth voltage value U3-2 is recorded; then after another duration of t/2, i.e., half of the first preset duration t, the third voltage value U3 is recorded; the ratio of U1-2 to U1 is calculated and recorded as the ratio of U2 to U1-2 is calculated and recorded as μ3, the ratio of U3 to U3-2 is calculated and recorded as μ3, the ratio of U3-2 to U4 is calculated and recorded as μ4, if the difference between μ1 and μ4 does not exceed a half and the difference between μ2 and μ3 does not exceed a half, it is determined that the slope comparison condition is satisfied.

In the embodiment, the determining device 504 is configured to define the contents on how to perform time comparison on a voltage signal to obtain a processed voltage signal.

Binary data is a machine language that a machine can identify, that is, datum "1" and datum "0". In the embodiment of the present disclosure, the first numerical code in the binary data can be either of the datum "1" and the datum "0", and the second numerical code in the corresponding binary data is the other numerical code except the first numerical code, for example, in one situation, when the first numerical code is the datum "1", the second numerical code is the datum "0"; in the other situation, when the first numerical code is the datum "0", the second numerical code is the datum "1"; in the embodiment of the present disclosure, it is adopted that the first numerical code is the datum "0" and the second numerical code is the datum "1".

For example, the determining device 504 is configured to take the moment when the sampling voltage value is greater than the reference voltage as a start moment, and record the first moment after a second preset duration; take the moment when the sampling voltage value of the bus is the maximum voltage value as a start moment, and record the second moment after the second preset duration; determine the first duration between the first moment and the second moment; determine the number of the first numerical codes according to the first duration and the duration corresponding to the first numerical codes; take the moment when the sampling voltage value of the bus is greater than the reference voltage again as a start moment, and record the third moment after the second preset duration; determine the second duration between the third moment and the second moment; determine the number of the second numerical codes according to the second duration and the duration corresponding to the second numerical codes; and determine the processed voltage signal according to the number of the first numerical codes, the number of the second numerical codes, the first numerical codes and the second numerical codes.

Generally, the method for determining the voltage signal on the bus is to determine the number of the first numerical codes and the number of the second numerical codes in the binary data according to the duration of the high level or the duration of the low level on the bus; due to the signal interference on the bus, the voltage collected by the air conditioner fluctuates greatly and the accuracy is low.

In order to solve the above problem, the embodiment of the present disclosure adopts the method of time comparison to determine the number of the first numerical codes and the number of the second numerical codes in the binary data and restore the data of the voltage signal according to the number of the first numerical codes and the number of the second numerical codes, and in this process, the influence of the above case on reading the signal is reduced and the reliability of the signal is ensured.

In any one of the above embodiments, when the difference between the first duration and the duration corresponding to M first numerical codes is less than or equal to a set value, it is determined that the first duration corresponds to M consecutive first numerical codes; when the difference between the second duration and the duration corresponding to N second numerical codes is less than or equal to the set value, it is determined that the second duration corresponds to N consecutive second numerical codes, and M and N are natural numbers.

In the embodiment, considering the influence of the bus which is too long, or the capacitance connected to the bus or the sampling resistor connected to the bus, the length of the voltage signal on the bus will change; in order to eliminate this influence, the fluctuation range between the first duration and the duration corresponding to the M first numerical codes is given, by calculating the difference between the first duration and the duration corresponding to the M first numerical codes and comparing the difference with a set value, whether the fluctuation range exceeds the set value is determined. If it does not exceed the set value, it is determined that the first duration corresponds to M consecutive first numerical codes, and it can be understood that the voltage signals between the first moment and the second moment correspond to M consecutive first numerical codes; based on the same reasons, the voltage signals between the second moment and third moment correspond to N consecutive second numerical codes; and in the above process, the voltage signal obtained by collection is restored and to obtain the processed voltage signal.

In any one of the above embodiments, the communication control method for an air conditioner further includes obtaining the baud rate of the air conditioner and the actual communication time on the bus; and determining the duration corresponding to the first numerical code and the duration corresponding to the second numerical code according to the baud rate and the actual communication time.

In the embodiment, considering that the baud rates for the air conditioner to communicate are different, the duration corresponding to the first numerical code will also be different from the duration corresponding to the second numerical code, and in order to ensure the accuracy of the target data model, it is necessary to calibrate the duration corresponding to the first numerical code and the duration corresponding to the second numerical code; and the duration corresponding to the first numerical code and the duration corresponding to the second numerical code are determined according to the baud rate of the air conditioner and the actual communication time on the bus.

In any one of the above embodiments, the actual communication time is the difference between the theoretical communication time on the bus and a first waiting time and a second waiting time, and the theoretical communication time can be understood as a duration when the voltage value on the bus is greater than or equal to the reference voltage, and after the first waiting duration is that the duration when the voltage value on the bus is greater than the reference voltage is the first waiting time, the obtaining of the sampling voltage value on the bus is started; based on the same reasons, the second waiting time is the time when sampling is not performed, which corresponds to the tail of the theoretical communication time.

In one of the embodiments, the first waiting time and the second waiting time belong to time when the voltage signal on the bus is not sampled, and their specific values can be preset.

For example, as shown in FIG. 9, in the case that the baud rate and the actual communication time are determined, the durations of the first numerical code and the duration of the second numerical code are determined, that is, the time of a single bit is also fixed.

After the first duration T1 is determined, the difference between the first duration T1 and a fixed time T is calculated, and the difference is compared with the set value, and the set value can be 0.5, if the difference between the first duration T1 and the fixed time T is less than 0.5, it is determined that the fixed time T is equal to the first duration T1 and it is determined that the air conditioner receives one "0"; based on the same reasons, if the difference between the second duration T2 and the fixed time T is less than 0.5, it is determined that the fixed time T is equal to the second duration T2 and it is determined that the air conditioner receives one "1".

In the same manner, the third duration T3 is determined, and if the difference between the third duration T3 and two fixed times T is less than 0.5, it is determined that the air conditioner receives two "0", and so on, if the difference between the $N^{th}$ duration Tn and n fixed times T is less than 0.5, it is determined that the air conditioner receives one "0".

Figure 6:
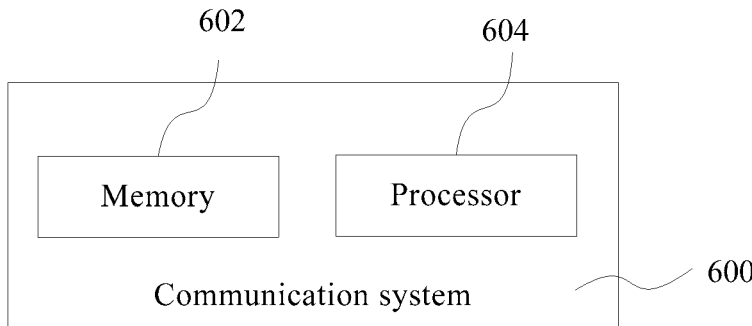
FIG. 6 is a schematic block diagram of a communication system in an embodiment of the present disclosure.

In an embodiment of the present disclosure, as shown in FIG. 6, a communication system 600 is provided, and it includes a processor 604, a memory 602 and a program or instruction which is stored in the memory and can run in the processor 604, and the steps of any communication control method for an air conditioner according to the embodiments are achieved when the program or instruction is executed by the processor 604.

The embodiment of the present disclosure provides a communication system 600, and the communication system 600 includes a memory 602 and a processor 604, and the processor 604 executes the program or the instruction stored in the memory 602 to achieve the steps of any communication control method for an air conditioner according to the embodiments, and thus, the communication system 600 has all the beneficial effects of any communication control method for an air conditioner described above.

In the embodiment, the communication system 600 executes the above method of the present disclosure through a disposed communication chip, and a communication data model is established, comparisons are made from the three dimensions of slope, voltage and time. After the comparisons are successful, correct communication data in the data model is outputted, to solve the problem of the communication signal error caused by external factors such as interference and cables, and improving the communication stability.

In an embodiment of the present disclosure, a readable storage medium is provided, and a program or an instruction is stored in the readable storage medium, when the program or the instruction is executed by the processor, the steps of any communication control method for an air conditioner according to the embodiments are achieved.

The embodiment of the present disclosure provides a readable storage medium, and when the program or the instruction stored in the readable storage medium is executed, the steps of any communication control method for an air conditioner according to the embodiments are achieved, and thus, the readable storage medium has all the beneficial technical effects of any communication control method for an air conditioner described above.

In the present disclosure, the term of "multiple" refers to two or more, unless otherwise clearly defined. The orientation or position relations indicated by the terms of "upper", "lower", and the like are based on the orientation or position relations shown in the accompanying drawings, and they are just intended to conveniently describe the present disclosure and simplify the description, and are not intended to indicate or imply that the devices or units as indicated should have specific orientations or should be configured or operated in specific orientations, and then should not be construed as limitations to the present disclosure. The terms of "connected with", "mounting", "fix" and the like should be understood in a broad sense, for example, the term "connect with" can be a fixed connection, a detachable connection, or an integral connection; the term "connected to" can be a direct connection or an indirect connection through an intermediate medium. The specific meanings of the above-mentioned terms in the present disclosure according to specific circumstances.

In the specification of the present disclosure, the description of the terms of "an embodiment", "some embodiments", "specific embodiment" and the like is intended to mean that the specific features, structures, materials or characteristics described in combination with the embodiments or examples are included in at least one embodiment or example of the present disclosure. In the specification, the illustrative expression of the above terms may not indicate the same embodiment or example. In addition, the specific features, structures, materials or characteristics described above may be combined with each other in an appropriate method in one or more of any embodiments or examples.

What is claimed is:

1. A communication control method for an air conditioner, wherein the air conditioner is connected with a bus, and the communication control method for an air conditioner comprises:

acquiring a voltage signal on the bus;

determining a voltage slope-rising edge and a voltage slope-falling edge in the voltage signal based on that the voltage signal satisfies a comparison condition of a power supply voltage of the air conditioner and a reference voltage on the bus;

performing time comparison on the voltage signal to obtain a processed voltage signal based on that the voltage slope-rising edge and the voltage slope-falling edge satisfy a slope comparison condition;

determining, from a data model library, a target data model that is consistent with the processed voltage signal; and outputting data information corresponding to the target data model.

2. The communication control method for an air conditioner according to claim 1, wherein determining that the voltage signal satisfies the comparison condition of the power supply voltage of the air conditioner and the reference voltage on the bus, based on that any sampling voltage value in the voltage signal is less than or equal to the power supply voltage of the air conditioner and a difference between the sampling voltage value and the reference voltage is greater than a preset threshold.

3. The communication control method for an air conditioner according to claim 1, wherein determining a first amplitude corresponding to the voltage slope-rising edge and a second amplitude corresponding to the voltage slope-falling edge; and determining that the voltage slope-rising edge and the voltage slope-falling edge satisfy the slope comparison condition, based on that a ratio of the first amplitude to the second amplitude is greater than 0.5 and less than 2.

4. The communication control method for an air conditioner according to claim 1, wherein the determining the voltage slope-rising edge and the voltage slope-falling edge in the voltage signal comprises:

recording a sampling voltage value as a first voltage value based on that the sampling voltage value of the bus is greater than the reference voltage;

recording the sampling voltage value as a second voltage value based on that a duration when the sampling voltage value of the bus is greater than the reference voltage is greater than or equal to a first preset duration;

taking a ratio of the second voltage value to the first voltage value as the voltage slope-rising edge;

searching for a moment when the sampling voltage value of the bus is a maximum voltage value and taking the moment as a start moment, and recording the sampling voltage value recorded after the first preset duration as a third voltage value; and taking a ratio of the maximum voltage value to the third voltage value as the voltage slope-falling edge.

5. The communication control method for an air conditioner according to claim 1, wherein the performing of the time comparison on the voltage signal to obtain a processed voltage signal comprises:

determining a moment when a sampling voltage value is greater than the reference voltage as a start moment, and recording a first moment after a second preset duration;

determining the moment when the sampling voltage value of the bus is the maximum voltage value as a start moment, and recording the second moment after the second preset duration;

determining a first duration according to the first moment and the second moment;

determining a number of a first numerical codes represented by the first duration according to the first duration and the duration corresponding to the first numerical code in binary data;

determining the moment when the sampling voltage value of the bus is greater than the reference voltage again as a start moment, and recording a third moment after the second preset duration;

determining the second duration according to the third moment and the second moment;

determining a number of the second numerical codes represented by the second duration according to the second duration and the duration corresponding to the second numerical codes in the binary data; and determining the processed voltage signal according to the number of the first numerical codes, the number of the second numerical codes, the first numerical codes and the second numerical codes.

6. The communication control method for an air conditioner according to claim 5, further comprising:

determining that the first duration corresponds to M consecutive first numerical codes, based on that a difference between the first duration and the duration corresponding to M first numerical codes is less than or equal to a set value; and determining that the second duration corresponds to N consecutive second numerical codes, based on that a difference between the second duration and the duration corresponding to N second numerical codes is less than or equal to the set value, wherein M and N are natural numbers.

7. The communication control method for an air conditioner according to claim 5, further comprising:

obtaining a baud rate of the air conditioner and the actual communication time on the bus; and determining the duration corresponding to the first numerical code and the duration corresponding to a second numerical code according to the baud rate and the actual communication time.

8. A communication system, comprising:

a processor, a memory; and a program or an instruction which is stored in the memory and can run in the processor, wherein the steps of the communication control method for an air conditioner according to claim 1 are achieved when the program or the instruction is executed by the processor.

9. A non-transitory readable storage medium, wherein a program or an instruction is stored in the readable storage medium, when the program or the instruction is executed by a processor, the steps of the communication control method for an air conditioner according to claim 1 are achieved.

10. A communication control apparatus for an air conditioner, wherein the air conditioner is connected with a bus, and the communication control apparatus for an air conditioner comprises:

an acquiring device, configured to acquire the voltage signal on the bus;

a determining device, configured to:

determine a voltage slope-rising edge and a voltage slope-falling edge in the voltage signal based on a situation that the voltage signal satisfies a comparison condition of a power supply voltage of the air conditioner and a reference voltage on the bus, perform time comparison on the voltage signal to obtain a processed voltage signal based on that the voltage slope-rising edge and the voltage slope-falling edge satisfy a slope comparison condition, and determine, from a data model library, a target data model that is consistent with the processed voltage signal; and an output device, configured to output data information corresponding to the target data model.

* * * * *